UNITED STATES PATENT OFFICE.

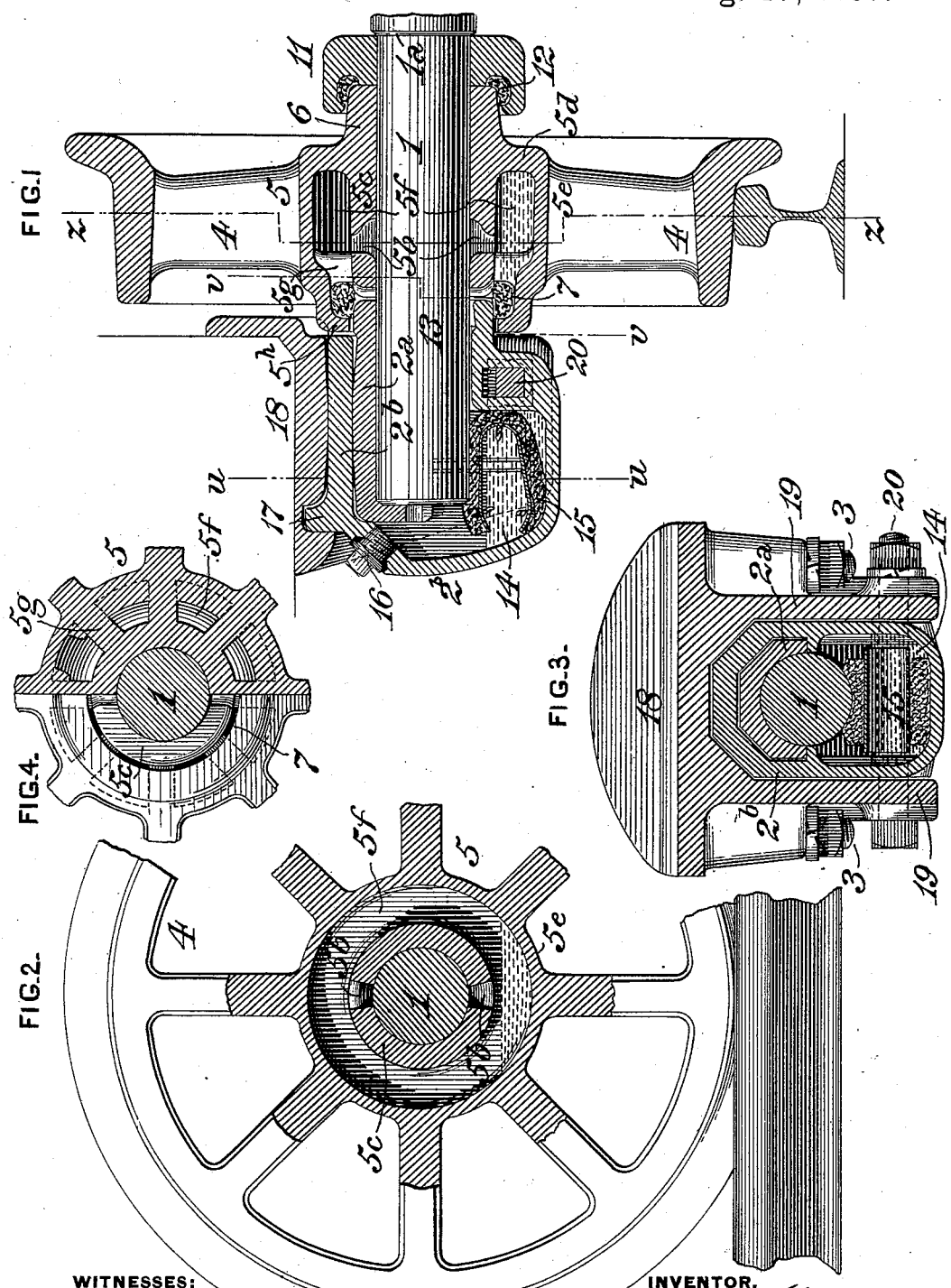

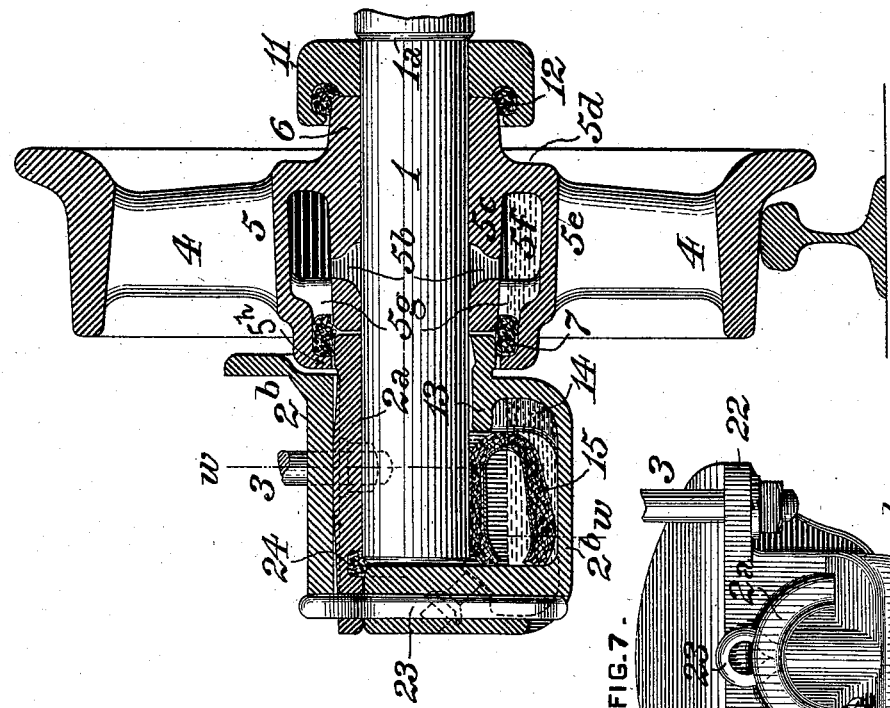

LUTHER R. FAUGHT, OF PHILADELPHIA, PENNSYLVANIA.

MINE-CAR RUNNING-GEAR.

SPECIFICATION forming part of Letters Patent No. 588,325, dated August 17, 1897.

Application filed September 8, 1896. Serial No. 605,095. (No model.)

*To all whom it may concern:*

Be it known that I, LUTHER R. FAUGHT, of Philadelphia, in the county of Philadelphia and State of Pennsylvania, have invented a certain new and useful Improvement in Mine-Car Running-Gear, of which improvement the following is a specification.

My improvement relates to the class of running-gear for mine-cars and cars for similar purposes known in the art as "self-lubricating," wherein the wheels and axles are free to rotate either independently or together and are provided with means for the storage of lubricating material and the supply thereof from a storage-receptacle to the wheel and axle bearings.

The object of my invention is to provide a simple and inexpensive running-gear for mine-cars and cars for similar purposes wherein by the construction of wheels and accessories a much longer wheel-hub can be used than in ordinary practice, thereby affording greater bearing-surface and consequent reduction of friction where most desired.

A further object of my invention is to so construct the wheels and pedestals or journal-boxes as to provide for maintaining a supply of lubricating material to be supplied to the bearings, as required, for effective operation, protecting the bearings from the access of dirt, muddy water, or other foreign matter, and allowing the cars to be tipped up on either side, thus causing the axles to assume a vertical position without causing the bearings to become dry or allowing lubricating material to escape.

The improvement claimed is hereinafter fully set forth.

In the accompanying drawings, Figure 1 is a vertical longitudinal section through a mine-car wheel and pedestal embodying my improvement, the pedestals or journal-boxes being in this case located outside of the wheels; Fig. 2, a vertical section on the line *z z* of Fig. 1; Fig. 3, a similar section on the line *u u* of Fig. 1, looking toward the body of the car; Fig. 4, a similar section on line *v v* of Fig. 1; Fig. 5, a view similar to Fig. 1, illustrating a modified form of journal-box; Fig. 6, a vertical section on the line *w w* of Fig. 5, and Fig. 7 an end view of the journal-box illustrated in Figs. 5 and 6.

In the construction of cars for mines and similar purposes it is desirable that they should be so designed that the car-body can be as wide and roomy as possible and at the same time permit of the use of a comparatively narrow track. In the constructions heretofore employed this has been accomplished by the use of wheels with very short hubs located close to the body of the car; but constructions of this character have been found unsatisfactory, owing to the incidental crowding of the pedestal or journal-boxes and consequent presentation of comparatively small wearing-surfaces at the points where friction is greatest, thereby adding greatly to the normal wear and tear upon the running-gear and materially shortening its period of usefulness. It is also desirable in mine-cars, &c., that the wheels and axles should be free to rotate independently of each other—that is to say, the wheels should rotate upon the axles and they in turn rotate in the journal-boxes located either between or outside of the wheels—in order to facilitate the movement of the cars around short curves without any binding or slipping action of the wheels or axles. Furthermore, it is desirable in the construction of wheels and axles, as above described, that means should be provided for maintaining a supply of lubricating material sufficient to last for a considerable length of time without replenishing to be supplied to the wearing-surfaces as required to effect proper lubrication and at any time irrespective of the positions said wearing-surface may assume.

In devising my invention I have sought to meet the requirements above set forth, first, by constructing the wheel-hubs and pedestals or journal-boxes in such a manner that they will fit one within the other either when the journal-boxes are located between or outside of the wheels, thereby providing much greater bearing-surface than is practicable in prior constructions and at the same time admitting of the use of a wide car-body; second, by making the wheel-hubs of a hollow construction, so as to provide an additional reservoir for lubricating material adjacent to the pedestal or journal-box and at the opposite end of the bearing-surfaces, thereby greatly adding to the reservoir capacity and permitting the flow of lubricating material along the whole length of the bearing-surfaces, irrespective of the angle which they may assume, and at the same time preventing the lubricating material from escaping and being wasted, as is usual in common practice; third, by constructing the wheel-hubs and pedestals or journal-boxes as above described I am enabled to protect the bearing-surfaces and lubricating material from the detrimental effects of dirt, muddy water, &c.

Referring to Figs. 1, 2, 3, and 4, I provide axles 1, which are journaled at their outer ends in journal-boxes $2^b$, secured to the bottom of the car-body in a manner to be presently described. Near the outer ends of the axles 1 and adjacent to the journal-boxes $2^b$ are journaled wheels 4, having hollow hubs 5, the central portions $5^c$ of which are made in the form of sleeves or hollow cylinders to provide bearing-surface on the axles 1. Around the inner sleeve $5^c$ and connected thereto at its rear end by means of a web $5^d$ is located an outer cylindrical wall or shell $5^e$ at such a distance from the inner sleeve as to form an annular chamber or reservoir $5^f$ within the hub for the reception of lubricating material. The inner sleeve $5^c$ is further connected to the cylindrical wall or shell $5^e$ by means of a series of radial arms or braces $5^g$, located near its end farthest from the web $5^d$. Openings $5^b$ are formed in the inner sleeve $5^c$ for the purpose of facilitating the passage of lubricating material between the annular chambers or reservoirs $5^f$ and the wheel-bearings. The outer cylindrical wall or shell $5^e$ projects beyond the solid portion $5^c$ and radial arms $5^g$ and is provided with an end lip or flange $5^h$, turned inwardly toward the axle to form an envelop or cover for the inner end of the journal-box $2^b$ and journal-bearing block $2^a$, which project therein, as presently to be described, and to retain fibrous packing. The annular space 7 between the outer end lip or flange of the cylindrical wall $5^e$ and the radial arms $5^g$ is filled with felt or other fibrous material to prevent the ingress of dirt, &c., to the wheel and axle bearings and also to facilitate the distribution of lubricating material to the same. The hollow hubs 5 are further provided with rearwardly-extending portions 6 back of the web $5^d$, which extensions afford additional wheel-bearing surface and abut against and are inclosed at their inner ends by collars 11, secured upon the axles 1 between the hub extensions 6 and shoulders $1^a$, formed upon the axles. An annular recess 12 is formed in the outer face of the collar 11, so as to encircle the adjacent end of the hub extension and admit of the introduction of a packing of felt or other fibrous material, which serves as a guard against the ingress of dirt, &c., to the wheel-bearings between the hub extensions 6 and collars 11.

The journal-boxes $2^b$ are provided with lower bearings 13 for the axles 1, located at their rear ends and projecting rearwardly therefrom for the same distance as the journal-bearing blocks $2^a$, which are interposed between the tops of the journal-boxes $2^b$ and axles 1. The lower bearings 13 and upper journal-bearing blocks $2^a$ incase the axle 1, and their rearwardly-projecting portions extend into the hollow hubs 5 a sufficient distance to nearly meet the inner sleeves $5^c$ thereof. The space between the ends of said bearing-blocks and the inner sleeve of the hub allows lubricating material to pass from the axle to the packing, of felt or other fibrous material, contained in the surrounding annular space 7, and said packing acts to exclude dirt, &c., therefrom, as well as to facilitate the distribution of lubricant to the outside of the lower bearings 13 and journal-bearing blocks $2^a$.

The journal-bearing blocks $2^a$ fit closely in the journal-boxes $2^b$, and their forward ends are turned downward, so as to bear against the ends of the axle 1, thereby acting as end stops and preventing longitudinal movement of the same in the boxes. The lower bearings 13 extend a short distance into the journal-boxes $2^b$, and a chamber or space 14 is formed in the boxes from their outer ends to the front walls of the boxes to act as a reservoir for the reception of lubricating material, which is supplied to the axles 1 through the medium of a U-shaped felt feeder 15, interposed between the lower side of the axle and the bottom of the journal-box in front of the lower bearing 13.

Lubricating material is introduced to the reservoir 14 through an opening formed in the front of the journal-box $2^b$, and closed by a screw-plug 16 or other suitable means, in sufficient quantity to fill the reservoir nearly level with the lower side of the axles, as indicated in the drawings. The lubricating material is taken up by the felt feeder 15 and transferred to the axle 1, along which it flows to the space between the bearing members 13 and $2^a$ and inner sleeve $5^c$, a small part escaping through said space, as already described, and the remainder continuing along the axle to the openings $5^b$ in the inner sleeve $5^c$, through which most of it passes to the reservoir $5^f$ in the hub. A small portion, however, continues along the axles to the inner end of the wheel-bearings thereon, where it is taken up by the felt packing in the annular opening 12 in the collar 11. It will be observed that the lubricating material while passing along the above-described course will lubricate all of the bearing-surfaces, while the felt packing in the spaces 7 and 12 will exclude dirt, &c., therefrom, thereby forming a bearing which is both self-lubricating and dirt-proof. It will further be observed that in the event of the axles assuming a vertical position, as when the car is turned up and resting with one side on the ground, the lubricating material will not escape from the bearings, but will be retained in either of the reservoirs 14 or 5ᶠ, dependent upon which end of the axles is uppermost.

The journal-boxes 2ᵇ are provided at their upper outer edges with transverse ribs 17, which fit in corresponding recesses formed in the under side of pedestals 18 to prevent longitudinal movement of the boxes. The pedestals 18 are provided with downwardly-projecting legs or plates 19, between which the journal-boxes are fitted to slide and to which they are secured by means of transverse square bolts 20, passing through the lower ends of the pedestal-legs and the journal-boxes directly below the lower bearings 13. The holes in the pedestal-boxes through which the bolts 20 pass are vertically elongated in order to allow of a slight up-and-down play of the parts. The pedestals 18 are secured to the car-body by means of vertical bolts 3, which pass through sockets on the pedestals on each side of the legs 19 thereof.

By the above-described construction of the pedestals and journal-boxes the wheels may be readily removed for the purpose of renewal or repair by first removing the transverse bolt 20 and then raising the car-body to which the pedestals 18 are attached until the transverse ribs 17 upon the journal-boxes 2ᵇ are free from the recesses in the under sides of the pedestals. The journal-boxes can then be removed from the axles and the corresponding wheels thereafter removed without necessitating the use of special machinery or the removal of the car from any position in a train or elsewhere in which it may happen to be.

Figs. 5, 6, and 7 illustrate a form of my improvement in which the essential features are similar to those last described and shown in Figs. 1, 2, 3, and 4, the only differences between the two constructions being in the journal-boxes. As shown in Figs. 5, 6, and 7, the pedestals 18 are dispensed with and the journal-boxes 2ᵇ are secured directly to the car-body by means of vertical bolts 3, which pass through lateral flanges 22, formed integral with the tops of said pedestal or journal-boxes.

The outer ends of the axles 1 abut against the adjacent ends of the journal-boxes 2ᵇ, which are made thicker than usual at the meeting points, and longitudinal movement of the axle is thereby prevented. The journal-bearing blocks 2ᵃ are fitted to slide in place through openings in the front of the journal-boxes and are held in place by means of vertical split keys 23, passing through openings near their front ends and in the journal-boxes. The journal-bearing blocks 2ᵃ are provided with grooves 24 on their inner surfaces, located over the planes of abutment of the axles and journal-boxes, said grooves being filled with felt or other fibrous material to prevent dirt, &c., from obtaining access to the bearings.

I claim as my invention and desire to secure by Letters Patent—

1. The combination, substantially as set forth, of a car-wheel having an oil-reservoir in its hub, an axle on which said wheel is journaled to rotate, an axle-box inclosing the axle adjacent to the wheel-hub and projecting thereinto, a journal-bearing block fitting in the axle-box and projecting into the hub, a collar on the axle inclosing the opposite end of the hub, an annular chamber in the hub for the reception of packing closing the joint between the axle-box and journal-bearing block and the hub, and an annular chamber in the collar for the reception of packing closing the joint between the collar and the hub.

2. The combination, substantially as set forth, of a car-wheel having an oil-reservoir in its hub, an axle on which said wheel is journaled to rotate, an axle-box inclosing the axle adjacent to the wheel-hub and projecting thereinto, a journal-bearing block fitting in the axle-box and projecting into the hub, a lower axle-bearing formed in the axle-box adjacent to its projection into the hub and an annular chamber in the hub for the reception of fibrous packing closing the joint between the axle-box and journal-bearing block and the hub.

3. The combination, substantially as set forth, of a car-wheel having an oil-reservoir in its hub, an axle on which said wheel is journaled to rotate, an axle-box inclosing the axle adjacent to the wheel-hub and projecting thereinto, a journal-bearing block fitting in the axle-box and projecting into the hub, a lower axle-bearing formed in the axle-box adjacent to its projection into the hub, a pedestal having side legs between which the axle-box is fitted, and a transverse connecting-bolt passing through said legs and through vertically-elongated openings in the lower bearing of the axle-box.

4. The combination, substantially as set forth, of a car-wheel, an axle on which said wheel is journaled to rotate, an axle-box inclosing the axle adjacent to the wheel-hub and projecting thereinto, a journal-bearing block fitting in the axle-box and projecting into the wheel-hub, an oil-reservoir in the wheel-hub, an annular packing-chamber in the wheel-hub inclosing the adjacent portions of the axle-box and journal-bearing block and closed by a lip or flange at its outer end, and a series of radial arms or braces interposed between the packing-chamber and oil-reservoir, said arms serving to retain the packing in position and to take up and distribute oil from the reservoir.

5. The combination, substantially as set forth, of a car-wheel, an axle on which said wheel is journaled to rotate, an axle-box inclosing the axle adjacent to the wheel-hub and projecting thereinto, an oil-chamber in the axle-box, a journal-bearing block fitting in the axle-box and projecting into the wheel-hub, an oil-reservoir in the wheel-hub, an annular chamber in the wheel-hub, closed by a lip or flange at its outer end, for the reception of fibrous packing closing the joint between the axle-box and journal-bearing block and the wheel-hub, and a U-shaped felt feeder fitting in the oil-chamber of the axle-box and bearing against the wall thereof and the periphery of the axle.

LUTHER R. FAUGHT.

Witnesses:
CHAS. E. PANCOAST,
JAMES F. MCMENAMIN.